3,314,798
DAIRY PRODUCT AND METHOD OF
PRODUCING SAME
Roy R. Graves, Germantown, Md., assignor to The Graves-Stambaugh Corporation, a corporation of Delaware
No Drawing. Filed Aug. 14, 1963, Ser. No. 301,945
9 Claims. (Cl. 99—123)

This invention relates to a multiple purpose dairy product having excellent spreading qualities when chilled and which, when packaged in a sealed, air-impervious container, has marked stability over a wide range of temperatures for a prolonged period, and relates further to a method of producing such a dairy product.

Heretofore, various efforts have been directed at developing a dairy product, more commonly referred to as a dairy spread, which will simulate the taste, texture and spreadability of butter, but which will not have the high butterfat content of butter and which can be sold at a price substantially below that of butter. As an example of such a development, reference may be had to U.S. Patent 2,878,126, wherein there is disclosed a dairy spread having a comparatively low percentage of butterfat, and allegedly the taste, consistency and spreadability characteristics of butter. While dairy spread products such as the one described in the aforementioned patent fulfill a need for a low butterfat spread as a substitute for butter, these products, generally speaking, so far as their field of use is concerned, serve no other function and therefore have only special and limited utility and they tend to lack stability at room temperatures and require refrigeration to give them a shelf-life at least comparable to that of butter.

It is an object of the present invention to provide a dairy spread of low caloric content which is not only an excellent substitute for butter as a spread, but is capable of functioning as a highly versatile base in the preparation of a wide variety of dairy or dairy-like products.

It is also an object of this invention to provide a dairy spread having excellent stability over a wide range of temperatures when packaged in a sealed, air-impervious container.

It is a further object of this invention to provide a method of producing the novel dairy spread described herein.

It is another object of the present invention to provide a method of producing a unique dairy spread from ingredients which are amenable to continuous processing through standard dairy processing equipment.

It is still another object of this invention to provide a method of producing a unique dairy spread from a combination of ingredients which together are capable of undergoing special treatment, particularly with respect to pressures and temperatures applied thereto in a continuous operation, without adversely affecting the body, flavor, spreadability, whippability or other desired characteristics of the finally produced dairy spread product.

These and other objects and features of the present invention will become apparent from, and are attained in accordance with, the following description.

The ingredients comprising the unique dairy spread product of the present invention include a dairy cream, milk, an emulsifier, one or more stabilizers and bodying agents, the emulsifier, stabilizers and bodying agents together constituting a minor proportion only of the product. Minor amounts of other ingredients advantageously are incorporated to enhance the taste, stability and versatility of the final dairy spread product.

The cream component of the product of this invention may be of a conventional grade and desirably has a butterfat content of approximately 40%. Creams of lesser butterfat content can be employed in the production of the dairy spread but, in achieving the objectives of the invention, it is advantageous to offset any butterfat deficiency in the cream utilized by appropriately varying the milk content of the product. In any event, the combined proportions of cream and milk employed in the preparation of the dairy spread should be such that the final product will have a butterfat content in the range of from about 22% to about 32%, especially desirably from about 25% to about 30%, a milk solids not fat content of from about 5% to about 9%, usually about 7%, and a lactose content of from about 1% to about 3%, usually from about 2% to about 2.5%.

In a variant aspect of the present invention, a versatile dairy spread having a somewhat higher butterfat content than that of the spread hereinabove described advantageously can be produced from a cream component richer in butterfat. Thus, for example, an excellent spread can be attained in accordance with the practice of this invention by utilizing a plastic cream component containing approximately 70% butterfat. Such a spread has a butterfat content of about 50% and has a flavor more closely resembling that of butter than the lower butterfat content spread. A dairy spread based on a higher butterfat content cream component desirably should comprise from about 45% to about 55%, preferably 50%, butterfat, from about 8.5% to about 9.5%, usually about 9.3%, milk solids not fat, and from about 1% to about 2%, generally about 1.5% lactose.

The milk ingredient of the dairy spread of this invention desirably is in the form of whole milk having a butterfat content of about 3.5%. The whole milk component of the spread effectively may be partially or entirely substituted by condensed skim milk or dry skim milk, however, to yield an excellent product. In those instances where dry skim milk is utilized in formulating the dairy spread, the dry skim milk advantageously is reconstituted with a suitable quantity of water to provide needed moisture to the formulation that would otherwise be lacking by the simple addition of the dry material per se.

The proportions of the cream and milk components of the dairy spread formulation are somewhat variable. In the particularly preferred products of the present invention, the cream, based on a butterfat content of approximately 40%, will comprise from about 65% to about 75%, usually about 70% to about 73%, of the total weight of the ingredients, while the milk, based on a non-fat milk solids content of from about 8% to about 10%, whether incorporated in the formulation as whole milk, condensed skim milk or reconstituted dry skim milk, will comprise from about 15% to about 30%, usually about 20% to about 25%, of the total.

In selecting the emulsifier, stabilizers and bodying agents to be incorporated into the formulation of the unique dairy spread of the present invention, those materials which demonstrate sufficient compatibility with one another to permit pre-mixing in a dry form without undergoing any physical or chemical change that would affect either their function or their efficiency are utilized. Furthermore, these components of the spread should be of a character such that, when they are subjected to various processing steps hereinafter to be described, they will not cause deposits to develop on those areas of the processing equipment with which they are brought into contact and, more importantly, will not undergo decomposition during processing. In addition, the emulsifier, stabilizers and bodying agents should be selected with a view to the effect they will have on the stability, taste, viscosity and other desirable characteristics of the final product, and should be used in such proportions that they will not impede or interfere with the processing of the dairy spread formulation. As indicated, the emulsifier, stabilizers and bodying agents comprise only a minor proportion of the total weight of the formulation and advantageously are employed in amounts such that, in toto, they will constitute from about 0.6% to about 3%, by weight, only, thereof.

The emulsifier desirably will constitute from about 0.3% to about 0.9% of the total weight of the formulation. There are a number of emulsifiers having utility for the purposes of the present invention. Among those emulsifiers producing the desired characteristics in the dairy spread are glyceryl monostearate, glyceryl distearate, glyceryl monomyristate, propylene glycol monostearate, sorbitol dilaurate, sorbitol monostearate, mannitol monomyristate, mannitol monolaurate, mixed mono- and di-glycerides of $C_{16}$–$C_{18}$ fatty acids, and the like, as well as, of course, mixtures of two or more emulsifiers. The emulsifier aids in the processing of the formulation, and, together with the stabilizers, enhances the whippability of the spread.

The stabilizers having utility in the preparation of the unique dairy spread of this invention, apart from their function of improving the stability of the spread, serve also to improve the texture and eating qualities of the product. Desirably the stabilizers are incorporated into the formulation of the spread in an amount ranging from about 0.1% to about 1%, especially desirably in proportions ranging from about 0.2% to about 0.7%, by weight. While there are a variety of stabilizers that can be used in the formulation of the spread, it is preferred to use a soft, non-gel forming gum, or mixtures thereof. Exemplary of gums having utility for this purpose are gum guar, locust bean gum, agar, gum tragacanth, gum arabic, gum acacia, gum karaya, alginates, and the like. Particularly desirable results can be obtained with an intimate mixing of gums comprising, by weight, 2 parts sodium alginate, one part locust bean gum and one part gum guar.

The bodying agents incorporated into the dairy spread of this invention serve, among other things, to enhance the smooth, creamy texture and spreadability of the product and, in addition, serve to improve the mouth-feel and eating qualities of the spread. There are numerous such agents that can be employed to advantage in the preparation of the spread and, depending upon the type and number of such agents utilized, the proportions thereof that will provide the results desired are variable. Generally speaking, the bodying agent or agents will comprise, by weight, from about 0.2% to about 2%, usually from about 0.4% to about 1%, of the formulation. Among the bodying agents having particular utility in this invention is sorbitol which, advantageously, is used in an amount ranging from about 0.4% to about 0.7%, by weight. Sorbitol has the property of not only imparting desirable bodying characteristics to the dairy spread of this invention but, also, augments the pleasing flavor of the product. Other bodying agents that can be utilized to advantage, especially in combination with others of such agents, are sodium caseinate and food grade polyphosphates, particularly alkali polyphosphates such as sodium and potassium tripolyphosphate. Sodium caseinate, in addition to acting as a bodying agent, serves also add to the nutritional value of the spread. In its dry form, sodium caseinate contains 90 to 95% protein. Furthermore, it has a high amino acid and vitamin content. The sodium caseinate desirably is added to the formulation of the spread in amounts varying from about 0.75% to about 1%, by weight.

Sodium tripolyphosphate, while functioning as a bodying agent, has been observed to impart other desirable properties to the dairy spread of this invention. In this regard, it has been discovered that extremely minor amounts, for example, in the range, by weight of the dairy spread product as a whole, of from about 0.001% to about 0.01%, has the effect of maintaining the viscous dairy spread formulation in a uniformly fluid state. This effect has significant advantages in processing the formulation in a closed, continuous system. In addition, sodium tripolyphosphate, incorporated into the formulation in the proportions suggested, improves the texture, mouth-feel and whipping properties of the spread.

Among the other materials worthy of mention having utility as bodying agents in the preparation of the dairy spread of the present invention is starch, for instance, corn starch, potato starch or wheat starch. Desirably it is incorporated into the formulation in amounts varying from about 1% to about 3%, more usually from about 1.5% to about 2%. Ordinary wheat flour may also be used to advantage in this connection.

It should be understood that the categorization of various of the agents described herein as either emulsifiers, stabilizers or bodying agents is not to be construed as limiting any one or more of such agents to the particular use in connection with which it happens to be mentioned, and that a number of such agents may conveniently serve additional functions in the preparation of the dairy spread of this invention. Thus, for example, the alginates, described herein as stabilizers, advantageously can serve as emulsifiers in accordance with the practice of the present invention.

Processing of the dairy spread formulation, in addition to the stability and taste properties of the final product, advantageously can be improved by incorporated acidulents, either with or without a buffering agent, into the formulation. Substances having particular utility in this connection are tartaric acid and citric acid, particularly the latter, in crystalline form. The quantity of citric acid crystals used can vary from about 0.005% to about 0.5%, by weight of the final dairy spread. While very satisfactory results are attainable with citric acid crystals alone, especially desirable effects are achieved with a suitably buffered solution of the crystals and a food grade acid such as glucono delta lactone, sorbic acid, vinegar, and the like. The amount of acid combined with the citric acid crystals can range from about 1% to about 3%, by weight, of the dairy spread formulation. There are a number of buffering agents that can be used, included among them being dicalcium phosphate, disodium phosphate, potassium citrate, and the like. The buffering agent, generally speaking, is present in amount of from about 0.4% to about 1% of the total weight of the formulation. A particularly suitable embodiment of such a buffered solution comprises about 0.3% citric acid crystals, about 2% vinegar, and about 0.8% dicalcium phosphate. In the preferred practice of this invention, the buffer advantageously is first added to the dairy spread formulation and thoroughly mixed therein. The acidulents are then introduced either at the initial stages in the preparation of the spread formula or at some later point in the processing of the formulation.

The pH of the dairy spread should not reach a level at which denaturization of the proteins in the various ingredients will occur. The pH of the dairy spreads of this invention may be as high as about 6.7 without adverse effects on the proteins. Generally speaking, the spread should have a pH of from about 5.0 to about 5.8.

The flavor of the dairy spread can be enhanced by the addition of seasoning agents. Particularly useful in this connection is salt which may be added in an amount, by weight, of from about 0.1% to about 1%. Sweetening agents such as corn sugar may also be added to improve taste if desired. The latter ingredient also imparts certain favorable bodying characteristics to the product.

While the unique dairy spread of this invention is prepared in a manner to inactivate microorganisms which might otherwise shorten the shelf-life of the spread, it may, in certain instances, be desirable to add a bacteriostat or fungistat to the formulation of the spread to prevent the development of viable microorganisms and spores, particularly mold and yeast spores, within the product after opening. A substance having utility for this purpose is sold under the trademark "Sorbistat," and is effective in the dairy spread of the invention in amounts ranging from approximately 0.1% to about 0.2%, by weight.

To impart a butter-like color to the dairy spread and, also, to further enhance its food value, minor amounts of a lipochrome such as carotene may be conveniently added to the spread formula. Carotene in amounts ranging from about 0.05% to about 0.01% is quite satisfactory.

In order that those skilled in the art may even more fully understand the manner in which the present invention may be practiced, specific embodiments of the dairy spread are hereinbelow set forth. It will be understood that these embodiments are only illustrative and are not to be construed as limitative of the invention in any manner. Thus, for example, the combinations of ingredients and the proportions thereof may be varied as indicated herein without departing from the principles of this invention.

*Example 1*

| Component: | Percent by weight |
|---|---|
| Cream, 40% butterfat | 72.5 |
| Whole milk, 3.5% butterfat | 25.0 |
| Sodium caseinate | 0.84 |
| Salt | 0.19 |
| Gums (mixture of 2 parts sodium alginate, and 1 part each of locust bean gum and gum guar) | 0.30 |
| Emulsifier (commercial mono- and diglycerides of $C_{16}$–$C_{18}$ fatty acids) | 0.50 |
| Citric acid crystals | 0.005 |
| Sorbitol | 0.50 |
| Sorbistat | 0.185 |

The foregoing formula gives a product having approximately 29.86% butterfat, 7.0% milk solids not fat, and 2.36% lactose.

*Example 2*

| Component: | Percent by weight |
|---|---|
| Cream, 40% butterfat | 70.0 |
| Whole milk, 3.5% butterfat | 21.6 |
| Sodium caseinate | 1.0 |
| Salt | 1.0 |
| Gum (sodium alginate) | 0.4 |
| Emulsifier (mixed mono- and diglycerides of $C_{16}$–$C_{18}$ fatty acids) | 0.1 |
| Vinegar | 2.0 |
| Sorbistat | 0.1 |
| Corn sugar (Frodex) | 2.0 |
| Starch | 1.4 |
| Potassium citrate | 0.3 |
| Carotene | 0.1 |

A product having the foregoing formulation contains 30.1% butterfat.

*Example 3*

| Component: | Percent by weight |
|---|---|
| Cream, 40% butterfat | 71.50 |
| Dry skim milk | 8.0 |
| Sodium caseinate | 1.0 |
| Salt | 1.0 |
| Gum (sodium alginate) | 0.25 |
| Emulsifier (glyceryl monostearate) | 0.47 |
| Vinegar | 2.0 |
| Citric acid crystals | 0.279 |
| Buffer (dicalcium phosphate) | 0.75 |
| Sodium tripolyphosphate | 0.001 |
| Carotene | 0.05 |
| Water | 14.7 |

A product produced in accordance with the foregoing formulation will have a butterfat content of 28.88%.

*Example 4*

| Component: | Percent by weight |
|---|---|
| Cream, 40% butterfat | 72.8 |
| Whole milk, 3.5% butterfat | 20.1 |
| Sodium caseinate | 1.0 |
| Salt | 1.0 |
| Gums (mixture of 2 parts sodium alginate, 1 part each of locust bean gum and gum guar) | 0.3 |
| Emulsifier (mixed mono- and diglycerides of $C_{16}$–$C_{18}$ fatty acids) | 0.5 |
| Vinegar | 3.5 |
| Sorbitol | 0.5 |
| Sorbistat | 0.2 |

A product having the foregoing formulation produced in accordance with this invention will have a butterfat content of 29.8%.

*Example 5*

| Component: | Percent by weight |
|---|---|
| Cream, 70% butterfat | 71.4 |
| Dry skim milk | 6.0 |
| Sodium caseinate | 1.5 |
| Starch | 1.0 |
| Disodium phosphate | 0.4 |
| Emulsifier (mixed mono- and diglycerides of $C_{16}$–$C_{18}$ fatty acids) | 0.3 |
| Salt | 1.0 |
| Sodium alginate | 1.1 |
| Water | 17.3 |

A product produced in accordance with the foregoing formulation will have a butterfat content of 50% and a milk solids not fat content of 9.29%.

In the preferred practice of preparing the dairy spread of the present invention, the principal components, in terms of weight percent, advantageously are first placed in a mixing tank. The other ingredients, with the exception of the sorbitol and the acidulents, desirably are formed into a premix which is then gradually added to the cream and milk in the mixing tank. The sorbitol and acidulents may then be added. In a particularly preferred practice of this invention, when forming a buffered solution, such as would be the case in the formulation set forth in Example 3, the acidulents conveniently are metered into the formulation during the preliminary stages of processing.

The ingredients in the mixing tank are heated to a temperature of approximately 105° F. to 115° F., usually about 110° F. The mixed ingredients are then pumped into a pre-heating tank where the temperature of the mixture is raised to about 160° to 165° F. It is important in a closed, continuous processing system to keep the mixture fairly hot so that it will remain fluid throughout processing. From the pre-heater the mixture is transferred to a deaeration chamber where a vacuum of approximately 20 inches is maintained. In the deaeration chamber, the mixture desirably is sprayed onto the wall of the chamber, near the top, and is allowed to flow down the sides in a thin sheet. Deaeration serves to remove oxygen from the mixture to render it more stable in packaged form, and serves also to remove volatile off flavors. Following deaeration, the mixture advantageously is pumped from the deaeration chamber to a second pre-heater to bring the temperature of the mixture to approximately 165° to 175° F. From the pre-heater the mixture is moved to a homogenizer. This phase of the operation is conveniently referred to as the pre-sterilization homogenization, and desirably takes place in two stages, the first stage being at a pressure of from about 1000 to 1500 p.s.i. and the second stage being at a pressure of 300 to 500 p.s.i., bringing the total pressure applied to the formulation at this point in the preparation of the dairy spread to from about 1300 to about 2000 p.s.i. After homogenization the mixture advantageously is moved through a heat exchanger where the temperature rapidly is raised to from about 280° to about 290° F., usually about 285° F. It desirably is held at this temperature for about 5 to 10 seconds. This treatment serves to effectively destroy any viable microorganisms and spores that may be present in the mixture. Following sterilization, the mixture advantageously is moved into a cooling heat exchanger where the temperature of the mixture is reduced to about 160° to 170° F. From there the mixture desirably is moved into a sterile homogenizer where pressures of approximately 400 to 750 p.s.i. are maintained. From the sterile homogenizer the mixture is moved through another cooling heat exchanger and then desirably is packaged in the absence of air at a temperature of about 90° to 110° F. Packaging may be conveniently accomplished by placing the dairy spread product in a suitable container which advantageously is impervious to air and moisture. A number of such packages are now commercially available. A particularly suitable package for this purpose is sold under the trademark "Tetra-Pak." This relatively low cost container is a laminate composed of paper, foil and polyethylene.

The summation of the pressures placed on the mixture during homogenization in accordance with the hereinabove described practice advantageously is maintained at a level of from about 2000 to 2500 p.s.i. Pressures substantially in excess of the range specified tend to overly stiffen the final product thus adversely affecting its whipping properties. On the other hand, pressures well below this range result in a final product which lacks homogeneity and is fluid in character.

While the dairy spread formulation particularly advantageously is homogenized both before and after sterilization, good products can be attained by foregoing homogenization after sterilization, and, instead, subjecting the formulation to only a pre-sterilization homogenization, especially desirably in two stages. In following this practice of the invention, the first stage of the pre-sterilization homogenization is carried out at pressures of the order of 2000 to 2500 p.s.i. with the second stage being conducted at pressures ranging from 500 to 1000 p.s.i., bringing the total pressure applied to the formulation to from about 2500 to about 3500 p.s.i.

As indicated at the outset, the unique dairy spread of the present invention is extremely versatile and can serve as a base for the production of a number of dairy or dairy-like products. What is more, this can be done at a minimum cost to the consumer. In this connection, if the packaged product is thoroughly chilled or tempered, say to a temperature of 35 to 45° F., it becomes very stiff in body, in fact so stiff as to be non-fluid and yet has excellent spreadability. In this form it can be used as a spread on bread, crackers, hot cakes and so on. It has a sweet, bland taste. To weight watchers, or those on a special diet, the dairy spread of this invention is of special interest. Butter and margarine contain 80% fat as compared to 22% to 50% butterfat in the products of the present invention. The dairy spread described herein, therefore, will generally contain substantially fewer calories than will an equivalent weight of butter or margarine.

When the dairy spread of the present invention is blended with milk, say, for example, one part spread with one-quarter to one-half part milk, there will be obtained a product which is whippable. Not only does such a blend have the advantages from the standpoint of whippability of commercial whipping creams, but, economically speaking, it has the added significant advantage of costing approximately one-half the price of the commercial product. If one part of the dairy spread is combined with two parts of milk, a half and half cream combination having about a 12% fat content will result. This product can advantageously be blended with 15%, by weight, of sugar, and flavoring material added, to give an ice cream mix. Further, one part of the dairy spread of the present invention plus 20 parts milk to which 10.5%, by weight, of sugar has been added, plus a flavoring material, will give a blend of iced milk or a milk shake.

A very desirable sour cream product can be made with the dairy spread of this invention by adding one part of the spread to one part of cultured buttermilk. As is the case with the whippable blend hereinabove described, the sour cream product prepared from the dairy spread of this invention can be sold at approximately one-half the cost of its commercially available counterpart. Such a sour cream product also is whippable. In forming a cake topping with the spread of the present invention, equal parts by weight, or volume, of the spread are mixed with powdered sugar. The dairy spread of the present invention also may be formed into a salad dressing by blending the spread with crumbled cheese of any desired kind and adding milk to bring the dressing to the desired consistency. All of these products or blends may be made at extremely low cost, in fact, at a cost less than ready made products.

As indicated hereinabove, the unique dairy spread of the invention, even under non-refrigerated conditions, maintains its character for substantial periods, of the order of several months. No deterioration of the composition is experienced during storage at ordinary temperatures for prolonged periods of time. When the spread is to be used, it is only necessary to chill or temper it thoroughly at a temperature ranging from 35 to 45° F.

While my invention has been described in detail, no unnecessary limitations are to be read thereinto, the scope of the invention being set out in the appended claims.

What is claimed is:

1. A continuous method of preparing a spreadable dairy product which is stable at room temperatures and which is essentially non-fluid at ordinary refrigeration temperatures comprising forming a mixture of a dairy cream, fluid whole, condensed skim or reconstituted dry skim milk, emulsifier, stabilizer and bodying agent, heating the mixture to a temperature of from 160° F. to about 170° F., deaerating the heated mixture, homogenizing the deaerated mixture at a pressure of from about 1300 to 2000 p.s.i., sterilizing the mixture, cooling the sterilized mixture, homogenizing the sterilized mixture under substantially sterile conditions at a pressure of from about 400 to 750 p.s.i. to obtain a spreadable dairy product having a butterfat content of from about 22% to about 32%, a milk solids not fat content of from about 5% to about 9%, and a lactose content of from about 1% to about 3%, and packaging said product under conditions to maintain it in its sterile state.

2. A continuous method of preparing a spreadable dairy product which is stable at room temperatures and which is essentially non-fluid at ordinary refrigeration temperatures comprising forming a mixture of a dairy cream, fluid whole, condensed skim or reconstituted dry skim milk, emulsifier, stabilizer and bodying agent, heating the mixture to a temperature of from about 160° F. to about 170° F., deaerating the mixture, heating the deaerated mixture to a temperature of from about 165° F. to about 175° F., homogenizing the heated mixture in two stages, the first stage being at a pressure of from about 1000 to about 1500 p.s.i., the second stage being at a pressure of from about 300 to about 500 p.s.i., then sterilizing the mixture, cooling the sterilized mixture, homogenizing the sterilized mixture at a pressure of from about 400 to about 750 p.s.i. to obtain a spreadable dairy product having a butterfat content of from about 22% to about 32%, a milk solids not fat content of from about 5% to about 9%, and a lactose content of from about 1% to about 3%, and packaging said product under conditions to maintain it in its sterile state.

3. A continuous method of preparing a spreadable dairy product which is stable at room temperatures and which is essentially non-fluid at temperatures of from about 35° F. to about 45° F. comprising heating to a temperature of from about 160° F. to about 170° F. a mixture of from about 65% to 75% dairy cream having a butterfat content of about 40%, from about 15% to 30% fluid whole, condensed skim or reconstituted dry skim milk having a milk solids not fat content of from about 8% to about 10%, emulsifier, stabilizer and bodying agent, the emulsifier, stabilizer and bodying agent constituting, by weight, from about 0.6% to about 2% of the mixture and being characterized in that they are compatible with one another and do not undergo any substantial decomposition in said mixture in an essentially closed system at a temperature range of from about 280° F. to 290° F. over a short time period, deaerating the heated mixture, homogenizing the deaerated mixture at a pressure of from about 1300 to about 2000 p.s.i., heating the homogenized mixture to a temperature of from about 280° F. to about 290° F. and holding it within said temperature range for a time sufficient to sterilize the mixture, cooling the sterilized mixture to a temperature of from about 160° F. to about 170° F., and homogenizing the sterilized mixture at a pressure of from about 400 to about 750 p.s.i. under substantially sterile conditions, and packaging the homogenized and sterilized mixture under conditions to maintain it in its sterile state.

4. A continuous method of preparing a spreadable dairy product which is stable at room temperatures and which is essentially non-fluid at temperatures of from about 35° F. to about 45° F. comprising forming at a temperature of from about 100° F. to about 115° F. a mixture of from about 65% to 75% dairy cream having a butterfat content of about 40%, from about 15% to about 30% fluid whole, condensed skim or reconstituted dry skim milk having a milk solids not fat content of from about 8% to about 10%, from about 0.3% to about 0.8% of an emulsifier, from about 0.2% to about 0.5% of stabilizer gum, from about 0.001% to about 0.01% of sodium tripolyphosphate, heating the mixture to a temperature of from about 160° F. to about 165° F., deaerating the heated mixture, re-heating the deaerated mixture to a temperature of from about 165° F. to about 175° F., homogenizing the deaerated mixture at a pressure of from about 1300 to about 2000 p.s.i., heating the homogenized mixture to a temperature of from about 280° F. to about 290° F. and holding it within said temperature range for a time sufficient to sterilize the mixture, bringing the sterilized mixture to a temperature of from about 160° F. to about 170° F., homogenizing the sterilized mixture at a pressure of from about 400 to about 750 p.s.i., under substantially sterile conditions, and packaging the homogenized and sterilized mixture under conditions to maintain it in its sterile state.

5. A continuous method of preparing a spreadable dairy product which is stable at room temperatures and which is essentially non-fluid at ordinary refrigeration temperatures comprising forming a mixture of a dairy cream, fluid whole, condensed skim or reconstituted dry skim milk, emulsifier, stabilizer and bodying agent, heating the mixture to a temperature of from about 160° F. to about 170° F., deaerating the mixture, heating the deaerated mixture to a temperature of from about 165° F. to about 175° F., homogenizing the thus heated mixture in two stages, the first stage being at a pressure of from about 2000 to 2500 p.s.i., the second stage being at a pressure of from about 500 to 1000 p.s.i., sterilizing the homogenized mixture, cooling the sterilized mixture to obtain a spreadable dairy product having a butterfat content of from about 22% to about 50%, a milk solids not fat content of from about 5% to about 9.5%, and a lactose content of from about 1% to about 3%, and packaging said product under conditions to maintain it in its sterile state.

6. A spreadable dairy product which is stable at room temperatures and which is essentially non-fluid at a temperature of from about 35° F. to about 45° F. comprising, basis weight, a homogenized and sterilized mixture of from about 65% to about 75% dairy cream having a butterfat content of about 40%, from about 15% to about 30% fluid whole, condensed skim or reconstituted dry skim milk having a milk solids not fat content of from about 8% to about 10%, from about 0.3% to about 0.8% of an emulsifier, from about 0.2% to about 0.5% of a non-gel forming stabilizer, and from about 0.2% to about 2% of a bodying agent containing from about 0.001% to about 0.01% of an alkali tripolyphosphate, said emulsifier, stabilizer and bodying agent being characterized in that they are compatible with one another and do not undergo any substantial decomposition in said mixture in an essentially closed system at a temperature range of from about 280° F. to about 290° F. over a short time period, said product being characterized by having a butterfat content of from about 22% to about 32%, a milk solids not fat content of from about 5% to about 9%, and a lactose content of from about 1% to about 3%.

7. A spreadable dairy product which is stable at room temperatures and which is essentially non-fluid at a temperature of from about 35° F. to about 45° F. comprising, basis weight, a homogenized and sterilized mixture of from about 65% to about 75% dairy cream having a butterfat content of about 40%, from about 15% to about 30% fluid whole, condensed skim or reconstituted dry skim milk having a milk solids not fat content of about 8% to about 10%, from about 0.3% to about 0.8% of an emulsifier comprising a glyceride of a higher molecular weight fatty acid, from about 0.2% to about 0.5% of a soft, non-gel forming stabilizer gum, from about 0.2% to about 2% of a bodying agent containing from about 0.001% to about 0.01% of sodium tripolyphosphate, said emulsifier, stabilizer and tripolyphosphate being characterized in that they are compatible with one another and do not undergo any substantial decomposition in said mixture in an essentially closed system at a temperature range of from about 280° F. to about 290° F. over a short time period, said product being characterized by having a butterfat content of from about 22% to about 32%, a milk solids not fat content of from about 5% to about 9%, and a lactose content of from about 1% to about 3%.

8. A spreadable dairy product which is stable at room temperatures and which is essentially non-fluid at a temperature of from about 35° F. to about 45° F. comprising, basis weight, a homogenized and sterilized mixture of from about 65% to about 75% cream having a butterfat content of about 40% to about 70%, from about 15% to about 30% fluid whole, condensed skim or reconstituted dry skim milk having a milk solids not fat content of from about 8% to about 10%, from about 0.3% to 0.5% of an emulsifier, from about 0.2% to about 0.2% to about 2% of a bodying agent containing from about 0.001% to about 0.01% of an alkali tripolyphosphate, said emulsifier stabilizer and bodying agent being characterized in that they are compatible with one another and do not undergo any substantial decomposition in said mixture in an essentially closed system at a temperature range of from about 280° F. to about 290° F. over a short time period, said product being characterized by having a butterfat content of from about 22% to about 50%, a milk solids not fat content of from about 5% to about 9% and a lactose content of from about 1% to about 3%.

9. A spreadable dairy product which is stable at room temperatures and which is essentially non-fluid at a temperature of from about 35° F. to about 45° F. comprising, basis weight, a homogenized and sterilized mixture of from about 65% to about 75% of a dairy cream having a butterfat content of about 40%, from about 15% to about 30% fluid whole, condensed skim or reconstituted dry skim milk having a milk solids not fat content of from about 8% to 10%, from about 0.3% to about 0.8% of an emulsifier comprising a mixture of mono- and diglycerides of higher molecular weight fatty acids, from about 0.2% to about 0.5% of a soft, non-gel forming stabilizer gum, from about 0.4% to about 0.7% sorbitol, from about 0.002% to about 0.007% of a food grade acidifying agent, and from about 0.1% to about 1% of salt, said product being characterized by having a butterfat content of from about 22% to about 32%, a milk solids not fat content of from about 5% to about 9%, a lactose content of from about 1% to about 3%, and a pH in the range of from about 5 to about 5.8.

References Cited by the Examiner

UNITED STATES PATENTS

| | | | |
|---|---|---|---|
| 2,081,273 | 5/1937 | Hoermann et al. | 99—117 |
| 2,617,730 | 11/1952 | Long et al. | 99—123 X |
| 2,878,126 | 3/1959 | Roberts | 99—117 |
| 3,010,830 | 11/1961 | Berndt et al. | 99—123 |
| 3,041,186 | 6/1962 | Hastrich | 99—211 |

FOREIGN PATENTS

| | | |
|---|---|---|
| 108,079 | 7/1939 | Australia. |
| 574,389 | 1/1946 | Great Britain. |

OTHER REFERENCES

Altschul, "Processed Plant Protein Foodstuff," 1958, Academic Press, N.Y., pp. 408–409, copy in Group 170.

"Condensed Chemical Dictionary," 1956, Reinhold Publ. Co., N.Y., p. 1020.

McDowall, F. H., "Buttermaker's Manual," vol. I, pp. 322, 323, vol. II, pp. 1127 to 1129, 1953, New Zealand Univ. Press, Wellington.

Norman, G. H., et al., "Reconstituted Butter-Like Spread," Milk Products Journal, vol. 48, No. 12, December 1957, p. 55.

Speel, H. C., "Mannitol and Sorbitol in Pharmacy," American J. Pharmacy, 1941, p. 6.

Tucker, J., "Phosphates in Foods," 1959, Cereal Science Today, vol. 4, N.Y., April 1959, pp. 91–92.

Whittier et al., "Byproducts From Milk," Reinhold Publ. Co., N.Y., 1950, pp. 84, 85, 280.

A. LOUIS MONACELL, *Primary Examiner.*

HYMAN LORD, *Examiner.*

M. W. GREENSTEIN, *Assistant Examiner.*